Nov. 19, 1968  J. C. DRISKELL ETAL  3,411,893
PRODUCTION OF NITROGEN-PHOSPHORUS-SULFUR COMPOUNDS
Filed Aug. 30, 1965  2 Sheets-Sheet 2

John C. Driskell
Harry T. Lewis, Jr.  INVENTORS.

BY Robert A. Petruck
Agent

United States Patent Office 3,411,893
Patented Nov. 19, 1968

3,411,893
PRODUCTION OF NITROGEN-PHOSPHORUS-
SULFUR COMPOUNDS
John C. Driskell, Sheffield, and Harry T. Lewis, Jr.,
Florence, Ala., assignors to Tennessee Valley Authority, a corporation of the United States
Filed Aug. 30, 1965, Ser. No. 483,887
7 Claims. (Cl. 71—32)

ABSTRACT OF THE DISCLOSURE

A process for preparing a new highly concentrated, water insoluble, nonhygroscopic solid fertilizer intermediate in a reactor by the vapor phase reaction of ammonia, phosphorus and sulfur at 660° to 1100° F. Intermediate fertilizer products contain from about 4 to 9 percent sulfur and a total plant food content of 150 to 160 percent distributed as 39 to 42 percent N and from 110 to 117 percent $P_2O_5$ equivalent. The products have the empirical formula $PN_xH_yS_z$ where $x$ is greater than 1.6 but less than 3, $y$ is greater than 0 but not greater than 6, and $z$ is greater than 0 but less than 1. Fertilizer intermediate is hydrolyzed to water-soluble finished fertilizer material by treatment with steam at 435° to 525° F. and 380 to 900 p.s.i.g. for 0.5 to about 2 hours. Fertilizer product hydrolyzate contains about 12 to 16 percent nitrogen, 49 to 55 percent phosphorus pentoxide, and 1 to 3 percent sulfur.

---

Our invention relates to a new composition of matter which contains nitrogen, phosphorus, and sulfur, and more particularly to the production of such a composition by the vapor phase reaction of phosphorus, ammonia, and sulfur to yield a hard, dense intermediate, and still more particularly to a subsequent hydrolysis of this intermediate to yield a product that is suitable for use as a fertilizer, and even still more particularly to the production of an intermediate containing nitrogen, phosphorus, and sulfur wherein the total plant food is substantially in excess of 100 weight percent calculated on the basis of percent $(N+P_2O_5)$.

Heretofore it has been the practice in the industry to produce solid fertilizer compositions by numerous methods so as to obtain materials having the highest possible plant nutrient values of nitrogen and phosphorus. In such materials containing these two of the three principal plant nutrients, the total plant food content is normally expressed on an equivalent basis as total $(N+P_2O_5)$. In many of the prior-art methods, particularly those employed in the more recent years, there have been various attempts to produce materials containing these two nutrients by various direct reactions between ammoniacal nitrogen-containing constituents and phosphorus-containing constituents, and even more particularly by various direct methods of chemically combining ammoniacal nitrogen with elemental phosphorus or vapors thereof.

A fairly recent breakthrough in the above-mentioned endeavors for producing fertilizers directly from ammoniacal nitrogen and elemental phosphorus and containing maximum equivalence of $(N+P_2O_5)$ greatly in excess of other prior-art processes is found in U.S. Letters Patent 2,713,536, J. C. Driskell, and 3,131,992, O. C. Jones. As may be seen in Driskell's discussion of the prior art, numerous investigations in this field of fertilizer technology had been made at the time of his invention, and he, for the first time, was able to produce a material containing equivalent $(N+P_2O_5)$ wherein the maximum content thereof approached 100 percent. It may be shown that even the teachings of Driskell do not effect the theoretical realization possible in a maximum plant food content in the chemical system with which he was working. In addition, it may be shown that the products of Driskell, although higher in plant food than prior-art compositions, still lack the physical characteristics of hardness and density such that the handling of same would be commercially suitable to the industry. This showing may be obviated by U.S. Patent 2,856,279, T. P. Hignett et al, wherein Hignett refers to the Driskell composition as an intermediate product and teaches a subsequent hydrolysis treatment thereof so as to produce a fertilizer composition which, in addition to having higher plant food content than prior-art compositions, has the necessary handling and storage characteristics to render it suitable to the consumer.

Our invention is directed to a new composition of matter and method for its production, which composition of matter contains upwards of 160 percent total equivalent $(N+P_2O_5)$ and which composition in its intermediate form thereof is extremely water insoluble and stable, whereby its handling, storing, and shipping characteristics prior to application to the soil are extremely desirable and useful.

We have overcome the disadvantages inherent in solid fertilizers containing two of the principal plant nutrients, nitrogen and phosphorus, of the type shown in the prior art to a substantial extent in the present invention by providing a composition of matter which contains upwards of 160 percent equivalent $(N+P_2O_5)$ of its weight in the form of plant food and which is produced by a process of directly reacting in the vapor phase anhydrous ammonia, phosphorus, and sulfur at elevated temperatures. Furthermore, several new and advantageous features over conventional solid fertilizers containing the principal plant nutrients, nitrogen and phosphorus, are realized by the present invention.

Among these advantageous features are convenience in the preparation, handling, storing, and shipping of our composition prior to application to the soil, and more particularly to a relatively simple and convenient method for converting our composition of matter from a water stable form having the desirable handling characteristics mentioned above to a substantially water soluble form at or near the point of application to the soil. Therefore, the composition of our invention has the advantage over solid fertilizers of the prior art in economy and convenience of transportation and storage and further convenience in transforming same from a water stable form to a water soluble form at or near the point of application to the soil subsequent to the preparation, handling, storage, and shipping of said composition to said point of application.

The composition of our invention is free from the disadvantages of compositions of the prior art since in its intermediate form it can be shipped in open boxcars and stored in open bins whereby it is unaffected by inclement weather conditions. And finally, the material of our invention may, just prior to application to the soil, be readily and economically converted to an extremely water-soluble and plant-available form.

It is therefore an object of the present invention to provide a new solid composition of matter and a process for its production which composition contains unusually high amounts of available plant food.

Another object of the present invention is to provide a new solid composition of matter and a process for its production, which composition contains unusually high amounts of available plant food and which composition may be, just prior to application to the soil, readily and economically rendered soluble in water and thereby available to the crops for which it is intended to provide nutrient values.

Still another object of the present invention is to provide a new solid composition of matter and a process for its production, which composition contains unusually high amounts of available plant food, which composition may be, just prior to application to the soil, readily and economically rendered soluble in water and thereby available to the crops for which it is intended to provide nutrient values, and which composition is also extremely desirable wherein the application site soil is deficient in sulfur requirements in that the process of preparing our composition inherently ensures that plant nutrient values of sulfur are available therein.

Still further and more general objects and advantages of the present invention will appear from the more detailed description set forth below, it being understood, however, that this more detailed description is given by way of illustration and explanation only and not by way of limitation, since various changes therein may be made by those skilled in the art without departing from the spirit and scope of the present invention.

In carrying out the objects of our invention in one form thereof, we employ a reactor vessel and associated equipment wherein elemental phosphorus and sulfur in the vapor phase are reacted with the vapor from anhydrous ammonia at temperatures substantially above ambient. The composition withdrawn from our reactor vessel, for the sake of convenience and brevity, will be referred to in the following specification as "intermediate product." The intermediate product material of our invention contains upwards of 160 percent total (N+P$_2$O$_5$) and upwards to 10 percent sulfur and, in this form, is extremely water stable and insoluble. Our composition in this form is therefore easily handled, stored, and shipped in open containers under the most inclement weather conditions, as for example, in shipping in open holds of seafaring vessels without deleterious effect thereto such as caking, setting up, or hardening.

In one series of preliminary exploratory tests to obtain information on the reaction of phosphorus, sulfur, and ammonia in the temperature range of 390° to 1110° F. at atmospheric pressure, phosphorus and sulfur vapors were metered from calibrated saturators through heated glass lines to a Pyrex glass reaction chamber. The portion of the reaction vessel that was heated in the furnace to the desired temperature had a volume of about 85 cc. The ammonia used in the reaction served also as a carrier gas for the phosphorus vapor. Nitrogen was used as a carrier gas for the sulfur. The input phosphorus and sulfur vapors were added in proportions corresponding to the stoichiometry of the equation

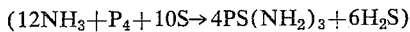

$$(12NH_3 + P_4 + 10S \rightarrow 4PS(NH_2)_3 + 6H_2S)$$

to produce phosphorus thiotriamide. From 50 to 100 percent excess of ammonia over that required to satisfy above equation was added in each test. The reaction temperature was measured by use of a thermocouple at the point of contact of the gasses. The reaction chamber was followed by traps and an electrostatic precipitator to collect solid products, a sulfuric acid scrubber to absorb unreacted ammonia, and a caustic scrubber to absorb any sulfides liberated by the reaction.

When temperatures of 1020° to 1110° F. were used, a white product was collected in the reaction tube. This product contained from 38 to 42 percent nitrogen, about 50 percent phosphorus, and from about 1.5 to 3 percent sulfur. The phosphorus and nitrogen in this product was almost completely water and citrate insoluble. A yellow product was collected in the cooler parts of the system downstream from the reaction chamber. This product turned white when gently heated in the absence of air. When exposed to air, the yellow product ignited; the residue contained from 24 to 28 percent nitrogen, 39 to 41 percent phosphorus (i.e. 89 to 84 percent P$_2$O$_5$), and 7.5 to 15 percent sulfur. About 34 percent of the total phosphorus in the product from the precipitator was citrate soluble. The white powder or reactor tube product obtained in these early tests is the composition termed in this specification as "intermediate product." This intermediate product was then subjected to our hydrolysis step which is the terminal step in our overall process. In these early preliminary investigations, small amounts (i.e. 4 or 5 grams of the white powder) were heated in a pressure reactor at various temperatures, pressures, and times, and the hydrolyzate was subsequently removed from the reactor and analyzed for total nitrogen and phosphorus pentoxide composition.

The reactor tube products obtained in these earliest tests were found to contain from about 38 to 42 percent nitrogen, about 50 percent phosphorus (approximately 115 percent P$_2$O$_5$ equivalent) and from about 2 to 10 percent sulfur, which is equivalent to from about 150 to about 160 percent total plant food.

Our invention, together with further objects and advantages thereof, will be better understood from a consideration of the following description taken in connection with the accompanying drawings in which.

Figure 1:
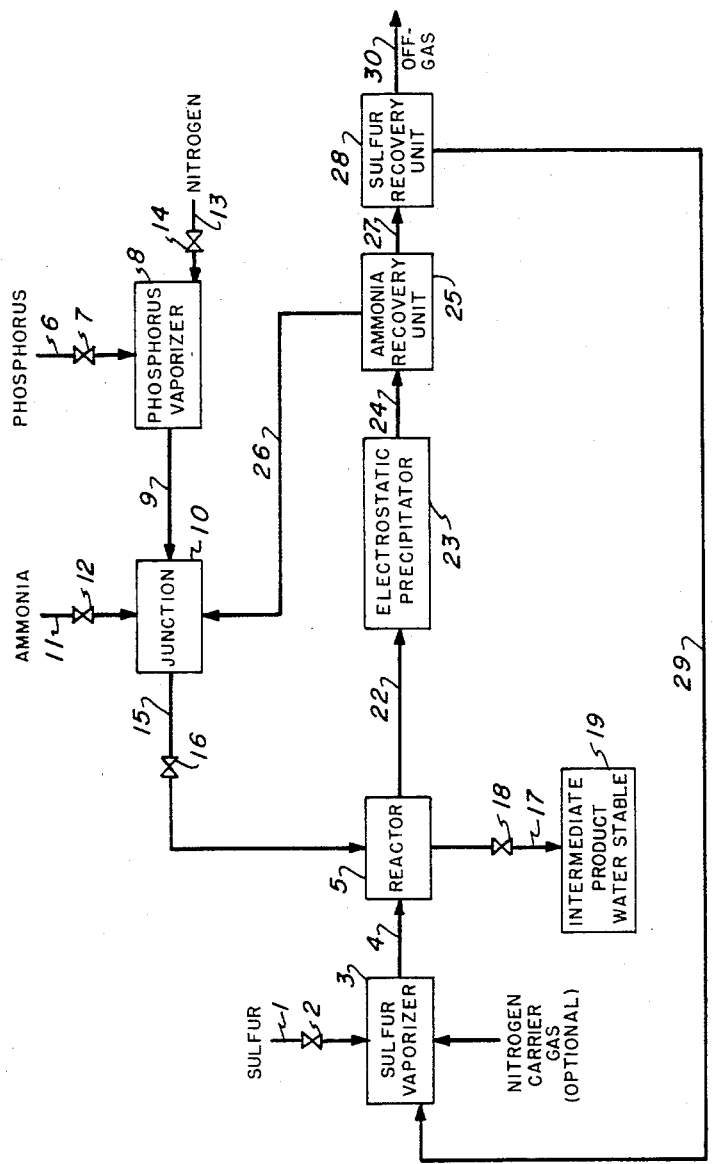
FIGURE 1 is a flowsheet generally illustrating the principles of our process which results in the intermediate solid product fertilizer having the novel properties mentioned above.

Referring now more particularly to FIGURE 1, sulfur from a source not shown is fed via line 1 and means for control of flow 2 into sulfur vaporizer 3, and subsequently via line 4 to reactor 5. Simultaneously elemental phosphorus from a source not shown in led via line 6 and means for control of flow 7 into phosphorus vaporizer 8. The resulting phosphorus vapor from phosphorus vaporizer 8 is led via line 9 downstream to junction 10 where it is admixed with ammonia from a source not shown and fed via line 11 and means for control of flow 12 into junction 10. Optionally, nitrogen as a carrier gas from a source not shown may be fed via line 13 and means for control of flow 14 to vaporizer 8 upstream from junction 10. In addition, nitrogen may be used as a carrier gas for the sulfur vapor and, as also shown in FIGURE 1, may be introduced, for instance, into the system at heater 3. We have found that it is desirable, however, that ammonia be admixed with the phosphorus vapor, as shown in FIGURE 1, downstream of phosphorus vaporizer 8.

The admixed ammonia and phosphorus vapor from junction 10 is led via line 15 and means for control 16 to reactor 5. The composition of our invention in its form as intermediate product may be withdrawn from reactor 5 via line 17 and means for control 18 into product collection vessel 19. The offgas may then be fed via line 22 to electrostatic precipitator 23 to stop any solid products and thence via line 24 to ammonia recovery unit 25. Ammonia recovered in unit 25 is recycled via line 26 to junction 10. Subsequently offgas is led from ammonia recovery unit through line 27 to sulfur recovery unit 28. Sulfur recovered in unit 28 is recycled via line 29 back to sulfur vaporizer 3 and offgas from sulfur recovery unit 28 is vented to the atmosphere via line 30.

Figure 2:
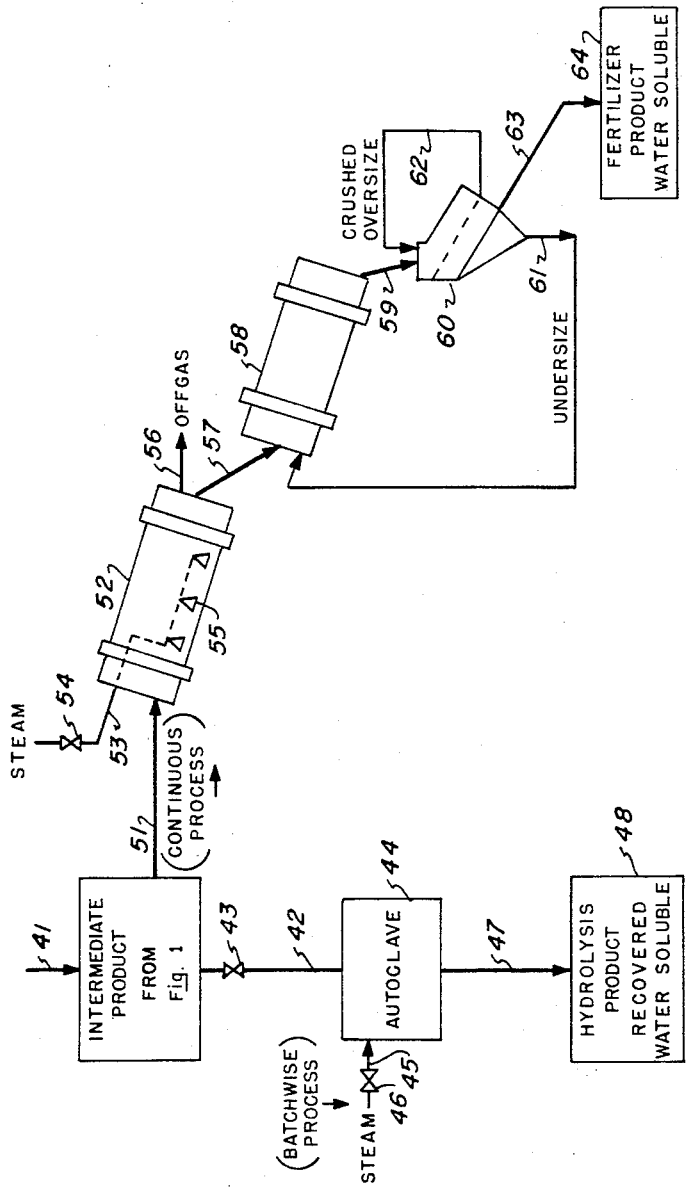
FIGURE 2 is a flowsheet generally illustrating the principles of our process for the hydrolysis treatment of the intermediate product subsequent to its handling, storage, shipment and just prior to its application to the soil.

Referring now more particularly to FIGURE 2, there is shown the terminal portion of our process wherein the intermediate product thereof is treated just prior to application to the soil by our method to render it from a water stable and insoluble form to a readily water soluble fertilizer material. In the case wherein our process for subsequent treatment of the intermediate product is performed on a batchwise basis, intermediate product from source 41 is led via line 42 and means for control of flow 43 to autoclave means 44. Steam from a source not shown is also led to autoclave means 44 via line 45 and means for control 46. After the intermediate material has been reacted in autoclave means 44 with the steam for a sufficient period of time under conditions of temperature and, in certain operating instances, pressure, which temperatures and pressures will be given in greater detail infra, the final fertilizer composition of our invention in a readily available form thereof is led from autoclave means 44 via line 47 to recovery region 48. In the instance where our hydrolysis of the intermediate product is to be carried out on a continuous basis, the intermediate product from 41 is fed via line 51 to hydrolysis reaction vessel 52, along with the steam from a source not shown fed to hydrolysis reaction vessel 52 via line 53 and means for control of flow 54. In one variation thereof, as is shown in FIGURE 2, the steam from line 53 may be introduced beneath the intermediate product in hydrolysis reaction vessel 52 by means of sparger 55. The offgases from hydrolysis reaction vessel 52, which offgasses contain principally air and water vapor, are led via line 56 to the atmosphere. The intermediate product which has been sufficiently hydrolyzed in vessel 52 is led via line 57 into, for example, a rotating drum 58 wherein drying, ammoniation, and granulation of the finished product may be effected. The granulated finished product is fed via line 59 to screening means 60, from which the oversize material is crushed and recycled via line 62 to the screening means and the undersize material is recycled via line 61 from screening means 60 back into drying and granulating vessel 58. The onsize finished fertilizer composition of our invention is withdrawn from screening means 60 via line 63 to product recovery region 64.

Postulated reactions of ammonia, phosphorus, and sulfur

In our early work in connection with the search for highly concentrated nitrogen phosphorus materials for fertilizer use, in addition to studies being made on the reaction of ammonia, phosphorus, and sulfur, an investigation was made into the prior art literature and the results of this early study indicated that some products which might be considered likely to result from such reactions include phospham, PNNH; phosphorus thiotriamide, $PS(NH_2)_3$; phosphorus nitride, $P_3N_5$; phosphoronitrilamide, $PN(NH_2)_2$; and phosphorus triamide, $P(NH_2)_3$. Work reported by Audrieth [1] and Van Wazer [2] indicates the possibility of obtaining the above compounds. The nitrogen and phosphorus contents of these compounds, if totally available as plant food, would be equivalent to from 102 to 164 percent of total plant food (percent N plus percent $P_2O_5$).

The following equations, which were postulated after studying the literature, were considered possible.

| Reaction | Product | Theoretical composition, percent | |
|---|---|---|---|
| | | N | P |
| (1) $8NH_3+P_4+10S \rightarrow 4PNNH+10H_2S$ | Phospham | 47 | 52 |
| (2) $12NH_3+P_4+10S \rightarrow 4PS(NH_2)_3+6H_2S$ | Phosphorus thiotriamide | 38 | 28 |
| (3) $20NH_3+3P_4+30S \rightarrow 4P_3N_5+30H_2S$ | Phosphorus nitride | 43 | 57 |
| (4) $12NH_3+P_4+10S \rightarrow 4PN(NH_2)_2+10H_2S$ | Phosphoronitrilamide | 54 | 40 |
| (5) $12NH_3+P_4+6S \rightarrow 4P(NH_2)_3+6H_2S$ | Phosphorus triamide | 53 | 39 |

These reactions may be considered to involve two steps: (1) the reaction of phosphorus with sulfur to form the pentasulfide ($P_4S_{10}$) and (2) the reaction of phosphorus pentasulfide with ammonia. It is possible, however, that the phosphorus and sulfur may react to give sulfides lower than the pentasulfide, such as phosphorus sesquisulfide ($P_4S_3$) and phosphorus heptasulfide ($P_4S_7$), in which case other reactions might be involved such as those listed below.

| Reaction | Product |
|---|---|
| (6) $P_4S_7+8NH_3 \rightarrow 4PNNH+7H_2S+3H_2$ | Phospham. |
| (7) $P_4S_7+12NH_3 \rightarrow 4PS(NH_2)_3+3H_2S+3H_2$ | Phosphorus thiotriamide. |
| (8) $3P_4S_7+20NH_3 \rightarrow 4P_3N_5+21H_2S+9H_2$ | Phosphorus nitride. |
| (9) $P_4S_7+12NH_3 \rightarrow 4PN(NH_2)_2+7H_2S+3H_2$ | Phosphorus nitrilamide. |
| (10) $P_4S_3+8NH_3 \rightarrow 4PNNH+3H_2S+7H_2$ | Phospham. |
| (11) $3P_4S_3+20NH_3 \rightarrow 4P_3N_5+9H_2S+21H_2$ | Phosphours nitride. |
| (12) $P_4S_3+12NH_3 \rightarrow 4PN(NH_2)_2+3H_2S+7H_2$ | Phosphorus nitrilamide. |
| (13) $P_4S_3+12NH_3 \rightarrow 4P(NH_2)_3+3H_2S+3H_2$ | Phosphorus triamide. |

All of the postulated reactions yield hydrogen sulfide, which, in practice, might be converted to elemental sulfur and recycled to the process. Hydrogen produced in some of the reactions might be usable for ammonia synthesis.

Little was known at the outset of our earliest work of the agronomic properties of the compounds that would result from the reactions discussed above, and one objective of our early work was to produce materials for exploratory greenhouse tests. Phosphorus nitride was produced previously in the laboratory by synthesis from the elements in an electric arc process [1] and by the reaction of phosphorus pentasulfide with ammonia at about 150° F.[2] In a greenhouse test (TVA Greenhouse Experiment No. 62), phosphorus nitride prepared by the electric arc process had little effect on plant growth. However, it is possible that the material might be used as a fertilizer intermediate and converted to available plant food by further processing. Also, phosphorus nitride produced at a lower temperature might have a higher availability.

Phosphorus thiotriamide was prepared previously by the use of a phosphorus chloride. An early greenhouse test (TVA Experiment No. 45) of the impure product indicated good response with respect to phosphorus. This product was not tested at that time with respect to nitrogen.

With the benefit of the prior art literature and our examination of the composition of our invetnion, we have concluded that the intermediate product produced thereby is a mixture of compounds, the empirical formula for which is interposed between the empirical formula for phosphorus thiotriamide $PS(NH_2)_3$ and phosphorus nitride $P_3N_5$ and may be written as follows: $PN_xH_yS_z$ where $x$ is greater than 1.6 but less than 3, $y$ is greater than 0 but not greater than 6, and $z$ is greater than 0 and less than 1. We have concluded that $x$, $y$, and $z$ in said empirical formula are dependent upon the temperature of reaction, and the time of reaction, and have further concluded, as will be shown in the following examples, that our composition may be produced in the temperature range from 660° F. up to 1110° F. with the preferred temperature range being above 660° F. and less than about 750° F.

In order that those skilled in the art may better understand how the present invention can be practiced and more fully and definitely understood, the following examples of the process which we have used in the production of a high-analysis (N+$P_2O_5$) fertilizer composition of the character indicated herein is given by way of illustration and not by way of limitation. For the sake of simplicity, the following examples will be given under two broad headings, to wit, the production of the intermediate

---

[1] Audrieth, L. F., and Kleinberg, J. Non Aqueous Solvents. John Wiley and Sons, Inc., New York, N.Y. (1953).
[2] Van Wazer, J. R. Phosphorus and Its Compounds I. Interscience Publishers, Inc., New York, N.Y. (1958).

[1] Huffman, E. O., Tarbutton, G., and Elmore, G. V., TVA Report No. 667. Preparation and Properties of Phosphorus Nitrides. November 16, 1954.
[2] Frear, G. L., and Ogg, E. F., TVA Report No. 2. Studies of Phosphorus-Nitrogen Fertilizers. November 14, 1941.

product, which encompasses our process up to the hydrolysis step, and to the treatment of the intermediate product and hydrolysis thereof to produce our fully conditioned fertilizer composition and render it in the desirable form of substantially complete water solubility.

Production of intermediate product

Example I.—Phosphorus and sulfur vapors were metered through heated glass lines to a Pyrex glass reaction chamber similar to the apparatus shown in FIGURE 1. In some of the first tests, the ammonia was added upstream of the phosphorus vaporizer and served as a carrier gas for the phosphorus vapor. As was mentioned supra, after our earliest work we found that it is most desirable to operate the equipment so that the ammonia vapor was added downstream of the phosphorus vaporizer. In this case, nitrogen was used as a carrier gas for the phosphorus vapor. In this series of tests, temperatures throughout the range of 390° F. to 1110° F. were used and the products from the reaction chamber were dry and free-flowing and remained so after exposure to the air. The results of these early series of tests are shown in Table I below.

TABLE I.—REACTION OF PHOSPHORUS, SULFUR, AND AMMONIA

| Reaction temp., °F. | Materials charged, cc./min.[1] | | | Reactor Products | | | | |
|---|---|---|---|---|---|---|---|---|
| | | | | Composition, percent | | | Atomic ratio, N:P | Weight ratio, N:P |
| | $NH_3$ | $P_4$ | S | N | P | S | | |
| 1,110 | 100 | 5 | 50 | 39 | 51 | 1.5 | 1.69 | 0.76 |
| 1,020 | 100 | 5 | 50 | 42 | 51 | 2.5 | 1.82 | 0.82 |
| 1,020 | 50 | 2.5 | 25 | 38 | 50 | 3.0 | 1.68 | 0.76 |
| 840 | 150 | 10 | 90 | 42 | | | | |
| 840 | 160 | 10 | 100 | 41 | | | | |
| 445 | 100 | 5 | 50 | 18 | | | | |
| 390 | 100 | 5 | 50 | 11 | | | | |

[1] Calculated at 32° F. and atmospheric pressure.

Example II.—In this series of tests, exploratory studies of the gas phase reaction of ammonia, phosphorus, and sulfur were continued. These tests were made at atmospheric pressure using substantially the same procedures and equipment described in Example I above.

In the tests made previously, a secondary product high in sulfur was collected in the electrostatic precipitator and in the lines leading to and from the precipitator. Both this product and the fumes expelled from the precipitator ignited spontaneously when exposed to air. In an effort to reduce the amount of this secondary product, a secondary reactor was installed immediately downstream from the reaction chamber to allow more time for the reaction to go to completion. Furthermore, it was thought that a small amount of phosphine might be present in the gas stream and that it caused spontaneous combustion of the precipitator products and exit fumes. Therefore, for these tests, the nitrogen used as a carrier gas for the phosphorus and sulfur vapors was deoxidized and dried before its entrance into the system for the purpose of eliminating side reactions in which phosphine might be generated.

The components were charged to the system based on calculations to form phosphorus thiotriamide, $PS(NH_2)_3$, or phospham, PNNH, as shown by the following equations:

$$P_4 + 10S + 12NH_3 \rightarrow 4PS(NH_2)_3 + 6H_2S \quad (1)$$

$$P_4 + 10S + 8NH_3 \rightarrow 4PNNH + 10H_2S \quad (2)$$

An excess of ammonia was added in each test. The reaction temperature was varied from 660° to 930° F. The secondary reactor was operated at 570° F.

The products in the reaction chamber were white, free-flowing solids that emitted a faint odor of hydrogen sulfide. As in previous tests, the products adhered to the walls of the reactor and were difficult to remove. Only small amounts of white products were obtained in the secondary reactor. Small amounts of yellow material, which became sticky and gummy on exposure to air, were collected in the precipitator. This material was high in sulfur and emitted a strong odor of hydrogen sulfide. It did not ignite spontaneously when exposed to air as in the previous tests. The weight of phosphorus and nitrogen in the material collected in the precipitator was less than one-tenth that found in the reactor product. The data from the tests, together with data from said previous tests, are tabulated in Table II below.

TABLE II.—REACTION OF PHOSPHORUS, SULFUR, AND AMMONIA

| Test No. | Reaction temp., °F. | Materials charged, cc./min. (S.T.P.) | | | Theoretical excess ammonia, percent | Reactor Product | | | | | Ammonia recovered in acid scrubber, percent of input |
|---|---|---|---|---|---|---|---|---|---|---|---|
| | | $NH_3$ | $P_4$ | S | | Composition, percent | | | Atomic ratio, N:P | Weight ratio, N:P | |
| | | | | | | N | P | S | | | |
| COMPONENTS CHARGED TO PRODUCE $PS(NH_2)_3$ | | | | | | | | | | | |
| 6 | 1,110 | 100 | 5 | 50 | 67 | 39 | 51 | 1 | 1.69 | 0.76 | |
| 5 | 1,020 | 100 | 5 | 50 | 67 | 42 | 51 | 2 | 1.82 | 0.82 | 65 |
| 7 | 1,020 | 50 | 2.5 | 25 | 67 | 38 | 50 | 3 | 1.68 | 0.76 | 70 |
| 12 | 930 | 108 | 4.6 | 46 | 100 | 40 | 50 | 5 | 1.77 | 0.80 | 61 |
| 13 | 930 | 108 | 4.6 | 46 | 100 | 40 | 48 | 4 | 1.85 | 0.83 | 61 |
| 15 | 930 | 108 | 4.6 | 46 | 100 | 40 | 50 | 5 | 1.77 | 0.80 | |
| 14 | 930 | 61 | 4.6 | 46 | 10 | 37 | 48 | 7 | 1.71 | 0.77 | 42 |
| 18 | 750 | 61 | 4.6 | 46 | 10 | 43 | 48 | 9 | 1.98 | 0.90 | 40 |
| 19 | 660 | 61 | [1] 5.1 | 46 | 10 | 39 | 48 | 9 | 1.80 | 0.81 | 15 |
| COMPONENTS CHARGED TO PRODUCE PNNH | | | | | | | | | | | |
| 16 | 930 | 41 | 4.6 | 46 | 10 | 37 | 49 | 8 | 1.67 | 0.76 | 5 |
| 17 | 840 | 41 | 4.6 | 46 | 10 | 35 | 46 | 13 | 1.68 | 0.76 | 3 |

[1] 10 percent theoretical excess phosphorus used.

Chemical analyses of the products indicated that they could consist of amorphous mixtures of phosphorus-nitrogen and phosphorus-sulfur-nitrogen compounds.

When the components were charged to produce phosphorus thiotriamide, decreasing the temperature of reaction from 1110° to 660° F. increased sulfur content of the product from 1 to 9 percent. The effect of temperature in the same range on the nitrogen and phosphorus contents was not significant. The nitrogen content was 37 to 43 percent and the phosphorus content was 48 to 51 percent. Products containing from 35 to 37 percent nitrogen, 46 to 49 percent phosphorus (i.e., 105 to 112 percent $P_2O_5$), and 8 to 13 percent sulfur were obtained at 840° F. and 930° F. when the components were charged to produce phospham.

The ammonia recovered in the scrubber was 40 to 70 percent of the input when 10 to 100 percent of excess ammonia was added to produce phosphorus thiotriamide. When 10 percent excess phosphorus was also used (test 19), the ammonia recovered in the scrubber was reduced to 15 percent of the input. When 10 percent excess ammonia was added to produce phospham, only 3 to 5 percent of the input ammonia passed to the scrubber.

In tests 13 and 14, the entrance half of the electrostatic precipitator was heated at 420° F. No material collected in the heated zone but formed in the cooler portion, which indicates that the material leaving the reactor was in the gas phase until it cooled below 420° F.

Example III.—In previous examples, products high in concentration, 150 percent and up ($N+P_2O_5$), were produced in the laboratory from the vapor phase reaction of phosphorus, sulfur, and ammonia. These products, however, were found to be insoluble and unavailable to plants in their present form. It was then suggested that these products be hydrolyzed with steam to form a solid fertilizer material. In this series of tests, a sufficient amount of product for later use in hydrolysis tests was prepared batchwise by reacting phosphorus, ammonia, and sulfur at about 660° to 710° F. This was done as follows:

Phosphorus and sulfur vapors were metered through heated glass lines to the reaction chamber. The approximate volume of the reaction zone (reactor plus side arm of reactor) was 850 cc. Nitrogen was used as a carrier gas for the phosphorus and the sulfur. Both nitrogen and ammonia were metered to the system by means of glass laboratory flowmeters. The input phosphorus (4.6 cc./min., STP) and sulfur (46 cc./min., STP) vapors were initially added in proportions calculated to form phosphorus thiotriamide [$PS(NH_2)_3$] as illustrated by the equation:

$$12NH_3 + P_4 + 10S \rightarrow 4PS(NH_2)_3 + 6H_2S$$

One hundred ten percent of the theoretical ammonia (61 cc./min., STP) was charged to satisfy the above equation. This charge of materials to the reactor produced only a small amount of product (about 1 g./hr.). In later tests, the production rate was increased by proportionally increasing the rates of addition of the reactants.

The reaction chamber was followed by an electrostatic precipitator to stop solid products, a sulfuric acid scrubber to absorb unreacted ammonia, and a caustic scrubber to absorb sulfides which were liberated by the reaction. Solids collected in the precipitator ignited when exposed to air.

About 200 grams of free-flowing product was produced in the tests. Chemical analyses showed that the products contained 38 to 40 percent nitrogen, 105 to 110 percent phosphorus pentoxide, and 7 to 9 percent sulfur. Only about 1 percent of the total nitrogen and 1 percent of the total phosphorus was soluble in water at room temperature (77° F.). This product could consist of phosphorus-nitrogen and phosphorus-sulfur-nitrogen compounds.

Hydrolysis of intermediate product

Example IV.—Exploratory tests were continued from Example III above to determine whether the insoluble products obtained from the vapor phase reactions of phosphorus, ammonia, and sulfur would hydrolyze with steam under pressure to form a soluble fertilizer material. In this series of tests, as in others, the equipment similar to that used in Example I above was employed. Two products were used in this first series of hydrolysis tests, which series of tests was carried out, for the sake of convenience, on a batchwise basis. One was prepared at a reaction temperature of 710°F., and contained 39.9 percent nitrogen, 109.7 percent phosphorus pentoxide, and 7.6 percent sulfur; the other was prepared at 660° to 700° F., and contained 38.1 percent nitrogen, 108.3 percent phosphorus pentoxide, and 7.0 percent sulfur. About 1 percent of the total nitrogen or phosphorus in each product was water soluble at room temperature (77° F.).

In a series of hydrolysis tests made at temperatures of 375° F., 435° F., or 480° F., 4 grams of products (−100 mesh) and 250 to 280 grams of water were heated in a glass liner in a Parr reactor of 2-liter capacity. In each test, a period of 1.75 hours was used to heat the reactor to test temperature. The time at test temperature of 375° or 435° F. was 2 and 4 hours and 2, 4, and 6 hours at 480° F. To obtain adequate stirring of the mixture, about 17 times the amount of water required for steam pressure at test temperature and for hydrolysis of the product was added. The mixtures were stirred at 100 r.p.m. The pressures at reaction temperature ranged from 190 to 600 p.s.i.g. At the end of a test, the reactor was cooled to room temperature. The hydrolyzate was removed from the reactor and filtered. The results of the tests are shown in Table III below.

TABLE III.—HYDROLYSIS WITH STEAM UNDER PRESSURE OF INSOLUBLE PRODUCT FROM VAPOR-PHASE REACTION OF PHOSPHORUS, AMMONIA, AND SULFUR

| Test [1] No. | Reaction temp., °F. | Time at reaction temp.,[2] hr. | Pressure, p.s.i.g. | pH [3] | Recovery in filtrate, percent of component charged | |
|---|---|---|---|---|---|---|
| | | | | | N | $P_2O_5$ |
| 1 [4] | 375 | ([5]) | 190 | 6.9 | 4 | 4 |
| 2 [4] | 375 | 2 | 190 | 7.0 | 20 | 20 |
| 3 [4] | 375 | 4 | 190 | 7.0 | 27 | 30 |
| 4 [4] | 435 | 2 | 380 | 7.2 | 63 | 64 |
| 5 [4] | 435 | 4 | 380 | 7.2 | 73 | 73 |
| 6 [6] | 480 | 2 | 600 | 7.2 | 82 | 82 |
| 7 [4] | 480 | 4 | 600 | 7.2 | 93 | 96 |
| 8 [6] | 480 | 6 | 600 | 7.3 | 96 | 96 |

[1] Four grams of product from vapor-phase reaction of phosphorus, ammonia, and sulfur, and 250 to 280 grams of water charged to Parr reactor of 2-liter capacity in each test. Water slurries of product stirred at 100 r.p.m.
[2] Time to reach test temperature, 1.75 hours.
[3] Measured with Accutint indicator paper.
[4] Product used produced at reaction temperature of 710° F.; contained 39.9% N, 109.7% $P_2O_5$, and 7.6% S. Less than 1% of total N or P was water soluble.
[5] Heated only to test temperature.
[6] Product used produced at reaction temperature of 660° to 700° F.; contained 38.1% N, 108.3% $P_2O_5$, and 7.0% S. One percent of total N or P was water soluble.

The data (test 1 to 8) indicate that hydrolysis of the product increased progressively with increase in reaction temperature and time. Essentially all of the product was hydrolyzed in 4 to 6 hours by treatment with steam at 480° F. and 600 p.s.i.g. Chemical analyses indicated that 93 to 96 percent of the nitrogen in the product and 96 percent of the phosphorus pentoxide were recovered as water-soluble material in the filtrates.

Increasing the test time from 2 to 4 hours increased the recovery of nitrogen and phosphorus pentoxide in the filtrates. At 375° F. the increase was from 20 to 27 percent and from 20 to 30 percent, respectively. At 435° F. the recovery of nitrogen increased from 63 to 73 percent and the phosphorus pentoxide from 64 to 73 percent. At 480° F. the recovery of nitrogen in the filtrate increased from 82 to 93 percent and the phosphorus pentoxide from 82 to 96 percent.

The pH of the hydrolyzates removed from the reactor varied from 6.9 (test 1) to 7.3 (test 8), indicating that ammonia was released as hydrolysis occurred. A portion of the filtrate from each test was evaporated at 130° F. to dryness. Petrographic analysis identified the solids as mainly monoammonium phosphate; however, the ammonia in excess of that required for monoammonium phosphate probably was driven off during drying. In a plant process the insoluble product would be treated with steam in an amount more nearly approaching that required for hydrolysis. The hydrolyzed material probably would be a mixture of mono- and diammonium phosphate.

Another test (No. 9) was made under conditions similar to test 7 to determine the amount of sulfur in the product (7.6 percent S) that would be hydrolyzed to water-soluble sulfur. Chemical analysis of the filtrate indicated that 72 percent of the sulfur charged as product was soluble.

Example V.—In the above Example IV, essentially all of the product obtained from the vapor phase reaction of the phosphorus, ammonia, and sulfur was hydrolyzed by heating it from 4 to 6 hours with steam at 480° F. and 600 p.s.i.g.; 82 percent was hydrolyzed in 2 hours. Evaporation of the hydrolyzate to dryness gave mainly monoammonium phosphate. The present series of tests was made with steam at 480° F. and 600 p.s.i.g. to determine whether the addition of phosphoric acid would promote hydrolysis of the product. In test 1, the phosphoric acid added (4.7 g.) was the amount required to give an N:P mole ratio of 1 in the hydrolyzate.

The tests were made in a Parr reactor of 2-liter capacity. In each test, 4.0 grams of solid and 275 grams of water with or without phosphoric acid were used. The large proportion of water was necessary in order to obtain adequate stirring in the reactor.

At the end of each test the reactor was cooled to room temperature, and the hydrolyzate filtered. Mother liquor was removed from the insoluble material by washing with several portions of water. The combined filtrate and washings were diluted to 1 liter and analyzed for total nitrogen, phosphorus pentoxide, and sulfur. The results of the tests are shown in Table IV below.

TABLE IV.—STEAM HYDROLYSIS OF PRODUCT FROM VAPOR-PHASE REACTION OF PHOSPHORUS, AMMONIA, AND SULFUR

| Test No.[1][2] | Promoter for hydrolysis, g. $H_3PO_4$ | Reaction temp., °F. | Time at reaction temp.,[3] hr. | Pressure, p.s.i.g. | pH[4] | Recovery in filtrate, percent of component charged as P-N-S-product | | |
|---|---|---|---|---|---|---|---|---|
| | | | | | | N | $P_2O_5$ | S |
| 6 | None | 480 | 2 | 600 | 7.2 | 82 | 82 | ---- |
| 1 | 4.7 | 480 | 2 | 600 | 3.9 | 89 | 86 | 64 |
| 2 | 0.9 | 480 | 2 | 600 | 6.4 | 87 | 86 | 79 |

[1] Four grams of product from vapor-phase reaction of phosphorus ammonia, and sulfur and 275 grams of water charged to 2-liter Parr reactor in each test. Slurries of product stirred at 100 r.p.m.
[2] Material used was produced at reaction temperature of 660° to 700° F. and contained 38.1% N, 108.3% $P_2O_5$, and 7.0% S. One percent of total N or P was water soluble.
[3] Time to reach test temperature, 1.75 hours.
[4] Measured with Accutint indicator paper.

The data (tests 1 and 2) indicate that the addition of phosphoric acid caused an increase in hydrolysis of about 5 percentage points over that obtained in a previous test (No. 6) where the product was heated at 480° F. and 600 p.s.i.g. without phosphoric acid. In tests 1 and 2, the recovery of nitrogen and phosphorus pentoxide in the filtrates was about the same, 89 and 86 percent, respectively.

Chemical analyses of the filtrates (tests 1 and 2) indicated that they contained from 0.18 to 0.22 gram of sulfur, which is equivalent to 64 to 79 percent of the sulfur charged as product.

Portions of the filtrates from the tests were evaporated at 130° F. Petrographic analyses identified the dry solids as mainly monoammonium phosphate. Chemical analyses indicated that the solids contained from 12 to 16 percent nitrogen, 50 to 55 percent phosphorus pentoxide, and 1 to 3 percent sulfur.

Example VI.—In Example V, in 2-hour tests at 480° F. and 600 p.s.i.g., the addition of phosphoric acid as a promotor for hydrolysis caused an increase of about 5 percentage points in hydrolysis of the product (82 to 87%). Evaporation of the hydrolyzates to dryness gave mainly monoammonium phosphate.

In the present series of tests, which were also carried out for the sake of convenience on a batchwise basis, investigations were made to determine the effect of retention time in reaction periods of 2 hours (test 13), 1 hour (test 12), and 0.5 hour (test 13). Also, a test (No. 14) was made at 480° F. and 600 p.s.i.g. for 2 hours for the addition of free ammonia as a promoter for hydrolysis. The ammonia added (3.7 g.) was equivalent to 200 percent of the amount of nitrogen in 4.0 grams of the product.

The tests were made in a Parr reactor of 2-liter capacity. In each test, 4.0 grams of product and 275 grams of water were used. The large proportion of water was necessary in order to obtain adequate stirring in the reactor.

At the end of each test the reactor was cooled to room temperature, and the hydrolyzate filtered. Mother liquor was removed from the insoluble material by washing with several portions of water. The combined filtrate and washings were diluted to 1 liter and analyzed for total nitrogen (tests 12 and 13), phosphorus pentoxide, and sulfur. The results of the tests are shown in Table V below.

TABLE V.—STEAM HYDROLYSIS OF PRODUCT FROM VAPOR-PHASE REACTION OF PHOSPHORUS, AMMONIA, AND SULFUR

| Test No.[1][2] | Promoter for hydrolysis, g. $H_3PO_4$ | Reaction temp., °F. | Time at reaction temp.,[3] hr. | Pressure, p.s.i.g. | pH[4] | Recovery in filtrate, percent of component charged as P-N-S-product | | |
|---|---|---|---|---|---|---|---|---|
| | | | | | | N | $P_2O_5$ | S |
| 3 | None | 525 | 2 | 910 | 7.4 | 98 | 98 | 75 |
| 12 | do | 525 | 1 | 910 | 7.2 | 94 | 93 | 75 |
| 13 | do | 525 | 0.5 | 910 | 7.2 | 89 | 87 | 71 |
| 6 | do | 480 | 2 | 600 | 7.2 | 82 | 82 | ---- |
| 1 | $H_3PO_4$, 4.7 | 480 | 2 | 600 | 3.9 | 89 | 86 | 64 |
| 14 | $NH_3$, 3.7 | 480 | 2 | 600 | >10 | ---- | 88 | 79 |

[1] Four grams of product from vapor-phase reaction of phosphorus, ammonia, and sulfur and 275 grams of water charged to 2-liter Parr reactor in each test. Slurries of product stirred at 100 r.p.m.
[2] Material used was produced at reaction temperature of 660° to 700° F. and contained 38.1% N, 108.3% $P_2O_5$, 7.0% S. One percent of total N or P was water soluble.
[3] Time to reach test temperature, 1.75 hours.
[4] Measured with Accutint indicator paper.

The data (test 12) indicate that essentially all the product was hydrolyzed in 1 hour by treatment with steam at 525° F. and 910 p.s.i.g. Chemical analyses indicated that 94 percent of the nitrogen and 93 percent of the phosphorus pentoxide in the product were recovered as water-soluble material in the filtrate. The data (test 3) indicate that essentially all of the product was hydrolyzed in 2 hours by treatment with steam at 525° F. and 910 p.s.i.g. Chemical analyses indicated that 98 percent of both the nitrogen and phosphorus pentoxide in the product was recovered as water-soluble material in the filtrate. Analyses of the filtrate (test 13) indicate that 89 percent of the nitrogen and 87 percent of the phosphorus pentoxide in the product were hydrolyzed in 0.5 hour under these same conditions.

The data (test 14) indicate that the addition of ammonia caused an increase in hydrolysis of the phosphorus pentoxide in the product of 6 percentage points over that obtained in a previous test (No. 6) where the product was heated for 2 hours at 480° F. and 600 p.s.i.g. without ammonia. The recovery of phosphorus pentoxide in the filtrate from test 14 was 88 percent. This is about the same recovery of phosphorus pentoxide obtained in a previous test (No. 1) where phosphoric acid was used as a promoter for hydrolysis.

Chemical analyses of the filtrates from the current tests (12, 13, and 14) indicated that they contained from 0.20 to 0.22 gram of sulfur, which is equivalent of 71 to 79 percent of the sulfur charged as product.

Portions of the filtrates from the tests were evaporated at 130° F. Petrographic analyses identified the dry solids as mainly monoammonium phosphate. Chemical analyses indicated that the solids contained from 12 to 14 percent nitrogen, 49 to 54 percent phosphorus pentoxide, and 2 to 3 percent sulfur.

While we have shown our invention in but several forms thereof, it will be obvious to those skilled in the art that it is not so limited but is susceptible to various changes and modifications without departing from the spirit thereof, and we desire, therefore, that only such limitations shall be placed thereupon as are specifically set forth in the appended claims.

What we claim as new and desire to secure by Letters Patent of the United States is:

1. A process for preparing a highly concentrated water insoluble nonhygroscopic fertilizer intermediate material which process comprises the steps of:
    (1) introducing into a reactor vessel the vapors of ammonia, phosphorus, and sulfur;
    (2) heating said vapors in said reactor vessel at a temperature in the range from about 660° F. to about 1100° F., thereby forming an intermediate product fertilizer material therein; and
    (3) withdrawing from said reactor vessel said intermediate fertilizer product.

2. A process for preparing a highly concentrated water insoluble nonhygroscopic fertilizer intermediate material which process comprises the steps of:
    (1) introducing into a reactor vessel the vapors of ammonia, phosphorus and sulfur;
    (2) heating said vapors in said reactor vessel at a temperature in the range from about 660° F. to about 750° F., thereby forming an intermediate product fertilizer material therein; and
    (3) withdrawing from said reactor vessel said intermediate fertilizer product.

3. The process of claim 1 wherein said vapors are introduced into said reactor vessel in mole proportions to one another as N:P:S in the ranges from about 10 to about 19:4: about 9 to about 10.

4. The process of claim 3 wherein said intermediate fertilizer product contains from about 4 to about 9 percent sulfur and a total plant food content in the range from about 150 to about 160 percent distributed as about 39 to about 42 N and from about 110 to about 117 $P_2O_5$ equivalent.

5. A process for preparing a highly concentrated, water soluble finished fertilizer material, which process comprises the steps of:
    (1) introducing into a reactor vessel the vapors of ammonia, phosphorus, and sulfur;
    (2) heating said vapors in said reactor vessel at a temperature in the range from about 660° F. to about 1100° F., thereby forming an intermediate product material therein, said vapors introduced into said reactor vessel in mole proportions to one another as N:P:S in ranges of about 10 to about 19:4: about 9 to about 10;
    (3) withdrawing from said reactor vessel said intermediate fertilizer product;
    (4) introducing said withdrawn intermediate fertilizer product into a hydrolyzer vessel together with aqueous medium;
    (5) heating said intermediate fertilizer product in said hydrolyzer vessel by subjecting said intermediate material and said aqueous medium to temperatures in the range of 435° F. to about 525° F. and at pressures in the range from about 380 p.s.i.g. to about 900 p.s.i.g. for a period in the range from about one-half to two hours;
    (6) and recovering as a highly concentrated water soluble fertilizer material the hydrolyzate from said hydrolyzer vessel.

6. A process for preparing a highly concentrated, water soluble finished fertilizer material which process comprises the steps of:
    (1) introducing into a reactor vessel the vapors of ammonia, phosphorus and sulfur;
    (2) heating said vapors in said reactor vessel at a temperature in the range from about 660° F. to about 1100° F., thereby forming an intermediate product material therein, said vapors introduced into said reactor vessel in mole proportions to one another as N:P:S in ranges of about 10 to about 10:4: about 9 to about 10;
    (3) withdrawing from said reactor vessel said intermediate fertilizer product;
    (4) introducing said withtdrawn intermediate fertilizer product into a hydrolyzer vessel together with aqueous medium;
    (5) heating said intermediate fertilizer product in said hydrolyzer vessel by subjecting said intermediate material and said aqueous medium to temperatures in the range of about 480° F. to about 525° F., and at pressures in the range from about 600 p.s.i.g. to about 900 p.s.i.g. for a period in the range from about one-half to about two hours.

7. The process of claim 5 in which the recovered fertilizer product material hydrolyzate contains from about 12 to about 16 percent nitrogen, from about 49 to about 55 percent phosphorus pentoxide, and from about 1 to about 3 percent sulfur.

References Cited

UNITED STATES PATENTS

| | | | |
|---|---|---|---|
| 2,713,536 | 7/1955 | Driskell | 71—32 X |
| 2,839,375 | 6/1958 | Christian | 71—32 |
| 3,131,992 | 5/1964 | Jones | 71—32 X |
| 3,343,939 | 9/1967 | Larson et al. | 71—32 |

DONALD H. SYLVESTER, *Primary Examiner.*

R. D. BAJEFSKY, *Assistant Examiner.*